United States Patent [19]
Lau et al.

[11] Patent Number: 5,937,660
[45] Date of Patent: Aug. 17, 1999

[54] QUICK COOLING AIR CONDITIONING SYSTEM

[76] Inventors: Billy Ying Bui Lau, 486 N. Vista Del Norte, Walnut, Calif. 91789; Shyh-Shyan Tung, 1219 Deventer Dr., La Verne, Calif. 91750

[21] Appl. No.: 09/008,606

[22] Filed: Jan. 17, 1998

Related U.S. Application Data

[63] Continuation of application No. 08/483,933, Jun. 7, 1995, abandoned, which is a continuation-in-part of application No. 08/299,501, Sep. 1, 1994, abandoned, which is a continuation-in-part of application No. 08/096,185, Jul. 26, 1993, Pat. No. 5,372,013.

[51] Int. Cl.$^6$ .............................. F25B 41/00; F25B 39/04
[52] U.S. Cl. ................................................. 62/174; 62/509
[58] Field of Search .................................... 62/196.1, 174, 62/498, 117, 509

[56] References Cited

U.S. PATENT DOCUMENTS

| | | | |
|---|---|---|---|
| 3,736,763 | 6/1973 | Garland | 62/85 |
| 3,769,808 | 11/1973 | Kramer | 62/115 |
| 3,855,813 | 12/1974 | Laurent | 62/196.3 |
| 5,094,086 | 3/1992 | Shyu | 62/218 |

*Primary Examiner*—William Wayner
*Attorney, Agent, or Firm*—Anthony J Baca

[57] ABSTRACT

A quick cooling air conditioning system that preserves high pressure refrigerant, in a portion of the refrigerant path or in a dedicated reservoir, after the shutdown of the air conditioning compressor. The quick air cooling is achieved by the instant application of high pressure refrigerant to the evaporator at the start-up of the air conditioning system.

26 Claims, 14 Drawing Sheets

REFRIGERANT FLOW DIRECTION 5,937,660

QUICK COOLING AIR CONDITIONING SYSTEM

This application is a continuation of U.S. application Ser. No. 08/483,933, filed Jun. 7, 1995 now abandoned which was a continuation in part of then U.S. application Ser. No. 08/299,501, filed Sep. 1, 1994, now abandoned which was a continuation in part of then U.S. application Ser. No. 08/096,185, filed Jul. 26, 1993 now U.S. Pat. No. 5,322,013 both herein incorporated by reference.

FIELD OF THE INVENTION

The present invention relates to refrigeration systems. More particularly, the present invention describes a means to provide a quick cooling effect.

BACKGROUND OF THE INVENTION

An air conditioning system cannot pump heat when the refrigerant is in the non-operating equilibrium. As used herein, a non-operating equilibrium state for the system is that state in which the high pressure side of the compressor is returned to a low pressure condition when the compressor is turned off. Assuming that all other factors remain the same, the closer the refrigerant in the system is to the operating equilibrium, the more efficient the heat pumping action. When the refrigerant in the system is at a non-operating equilibrium, the efficiency is zero, even though the compressor may be running. Heat pumping efficiency of the air conditioning system increases from zero as the refrigerant in the system reaches the operating equilibrium.

Conventional systems allow the refrigerant to return to a non-operating equilibrium when the compressor is turned off. As a result, the air conditioning system has no heat pumping action the instant it is turned on. As stated above, once the compressor is turned on the efficiency of the air conditioning system starts to increase from zero as the refrigerant in the system reaches the operating equilibrium. This causes a delay from the time the system starts using energy to the time the system begins to cool.

Attempts to provide quick cooling of an automobile's interior have been attempted. One such product that can quickly cool down the internal temperature of an automobile, is a pressurized spray can. Apparently, the cooling effect is achieved by the depressurization and evaporation of the chemical in the spray can. The major disadvantage of the product is that it is not reusable and has possible environmental impacts.

Therefore, the primary purpose of the present invention is to provide cooling action and to increase the heat pumping efficiency to a positive number the instant when the compressor of an air conditioning system is turned on.

SUMMARY OF THE INVENTION

According to this invention, the time to cool the interior of an automobile during the start-up can be shortened by the instant application of high pressure refrigerant to the evaporator at start-up of the air conditioning system. The high pressure refrigerant is supplied by a refrigerant reservoir, where the refrigerant reservoir is an addition to the conventional air conditioning system. Alternatively, high pressure refrigerant can be stored in a component or components in the high pressure refrigerant path such as the condenser, receiver, and the refrigerant dryer, or a combination thereof. A scheme has been proposed by this invention to integrate the refrigerant reservoir with the conventional air conditioning system to make this quick air cooling possible.

DETAILED DESCRIPTION OF THE INVENTION

Figure 1:
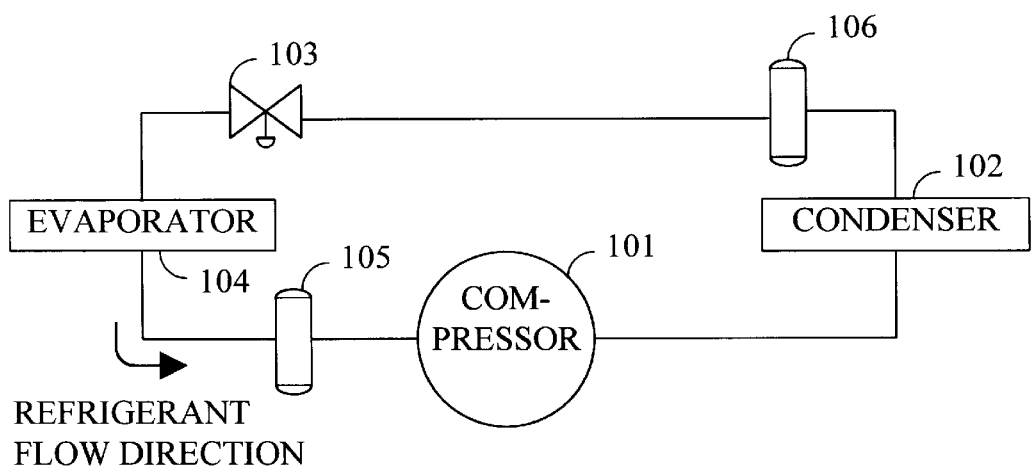
FIG. 1 is a schematic diagram showing a prior art air conditioning system.

A conventional air conditioning system is depicted in FIG. 1. The accumulator 105 and receiver 106 shown in FIG. 1 are optional. There may be other components in the system, such as dryer and valves. The existence and placement of such components including the accumulator 105 and the receiver 106 in the air conditioning system are not important to the basic principle of operation of the system and this invention. Therefore, they are not shown in any figure for clarity.

There are generally two equilibrium states that the system may be in. The first equilibrium state is referred as the non-operating equilibrium. After a system has not been in operation for while, the refrigerant will have the same pressure, phase, and temperature throughout the system. The second equilibrium state is referred to as the operating equilibrium. Referring to FIG. 1, when the system is in operating equilibrium, the following is a list of phase and pressure of the refrigerant in the system:

A) Between compressor 101 and condenser 102: high pressure, vapor phase, high temperature.

B) Between condenser 102 and expansion valve 103: high pressure, liquid phase, medium temperature.

C) Between expansion valve 103 and evaporator 104: low pressure, mixed vapor and liquid phase, low temperature.

D) Between evaporator 104 and compressor 101: low pressure, vapor phase, medium temperature.

It would be apparent to one skilled in the art that for a non-operating equilibrium system, when the compressor is first energized, no heat pumping action is accomplished. Furthermore, maximum heat pumping action is not achieved until the system reaches operating equilibrium.

To reduce this inefficiency, the air conditioning system may be used to give out cool air immediately if high pressure liquid and/or vapor refrigerant is available between the condenser 102 and the expansion valve 103 at the beginning of the operation of the air conditioning system.

The preferred embodiment is a modification of the conventional air conditioning system. The modification, as conceptually shown in FIG. 2, consists of the addition of three valves (206–208) and a pressurized refrigerant reservoir 205 for liquid refrigerant. A refrigerant receiver 106, which is normally in the air conditioning system, is not shown in FIG. 2 for clarification. However, it may be put in various locations as shown in FIG. 1 (element 106). Physically, the receiver, the refrigerant dryer, and the refrigerant reservoir may be combined into one unit depending on the actual design.

Opening and closing of the valves is synchronized with the operation of the compressor by controller 209. The exact embodiment of controller 209 is not necessary for one to understand the present invention. However, controller 209 may be realized by using a mechanical mechanism, an electrical circuit, a combinational or sequential circuit, or a microcontroller. Controller 209 controls the operation of the various valves and compressor 201. One skilled in the art will also understand that controller 209 may also control other functions of the air conditioner not shown here.

Figure 2:
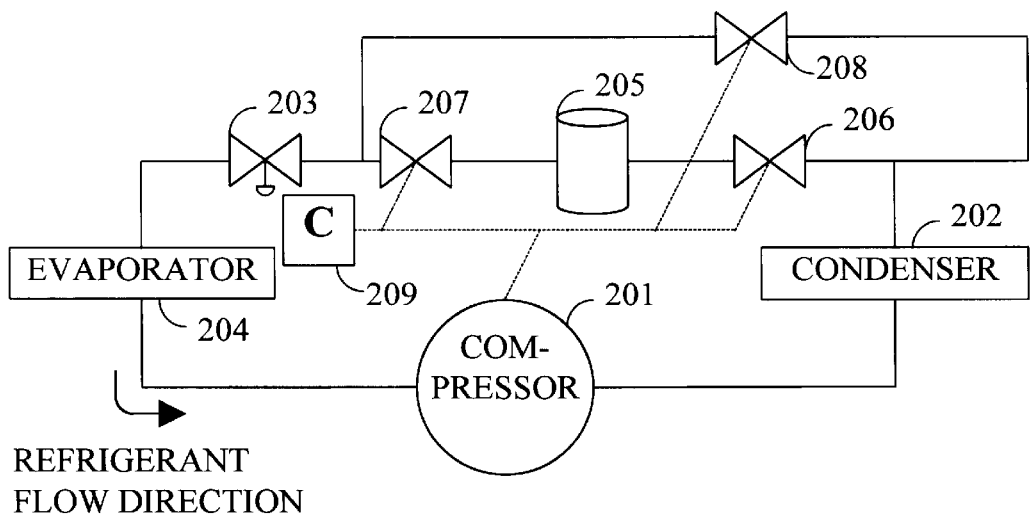
FIG. 2 is a schematic diagram showing an air conditioning system, together with the modification proposed by this invention.

Referring to FIG. 2, the present invention consists of a compressor 201, condenser 202, expansion valve or similar devices 203, evaporator 204, refrigerant reservoir 205, upstream valve 206, downstream valve 207, controller 209 and the optional bypass valve 208. Note that optional valve 208 allows the main system to return to a non-operating equilibrium state when the system is shut off, i.e., the high pressure side of the compressor is returned to a low pressure state when the compressor is turned off.

In normal operation, controller 209 enables compressor 201, keeps valves 206 and 207 open and valve 208 closed. The other parts of the system operate as in the conventional system. The refrigerant is compressed by the compressor 201, it releases heat and changes to liquid phase at the condenser 202. As with the conventional system, the liquid refrigerant vaporizes as it passes through expansion valve 203 to the evaporator 204 before returning to compressor 201. The air cooling is achieved by the heat absorption due to the depressurization and vaporization of liquid refrigerant at evaporator 204.

When controller 209 determines that it is time to turn off compressor 201, the valves along with the compressor must be properly synchronized. First, valve 207 is closed thereby stopping the flow of refrigerant from refrigerant reservoir 205. Next, compressor 201 is turned off. As compressor is turned off, controller 209 closes valve 206. If the optional bypass valve 208 is installed, controller 209 open it as the final operation. Thus, liquid refrigerant is trapped in the refrigerant reservoir and stays in the liquid phase under ambient temperatures. Refrigerant in the rest of the system reaches the non-operating equilibrium state.

When controller 209 determines that compressor 201 must be re-started, again compressor 201 and valves must be proper sequenced. In the preferred embodiment, controller 209 first closes valve 208 if it is installed. Next, compressor 201 is started. Controller 209 then opens valve 207 thereby allowing the refrigerant stored in refrigerant reservoir 205 to provide an immediate cooling effect. Next, valve 206 is opened. Liquid refrigerant in the refrigerant reservoir 205 will flow through expansion valve 203 (or similar devices) to evaporator 204 to provide quick cooling at the instant when the air conditioner is turned on. The time for the refrigerant in the preferred embodiment to achieve the operating equilibrium after turned on is greatly reduced compared to the time required for the conventional air conditioning system. Thus, the preferred embodiment has a positive heat pumping efficiency at start up while the conventional air conditioning system has zero efficiency at start up.

It may be necessary to delay the switching of valves 206–208 to allow the compressor to come up to speed first, thereby reducing start-up stress on compressor 201. It may also be desirable to simultaneously turn on the compressor and switch valve 206–208 or even switch valves 206–208 before starting compressor 201. Another possible solution, valve 206 could remain closed while valve 208 is closed and 207 is opened. This will keeps liquid refrigerant from back flowing into the compressor 201. Numerous possible combinations for sequencing the valves are possible; one skilled in the art will understand that the preferred embodiment described above may easily be deviated from.

The preferred embodiment provides several advantages to other quick cooling solutions. The preferred embodiment can be added to existing air-conditioning systems with minimal modification to the original air conditioning system. Refrigerant reservoir 205 and valves 206–208 could all be manufactured into to a single component. Assuming that the receiver (106 in FIG. 1) and dryer are between the condenser 102 and expansion valve 103, the single component can incorporate the functions of a receiver and dryer and replace both.

As stated above, the present invention requires a relatively simple control system. Basically, the control system (controller 209) opens valves 206 and 207, closes valve 208, when compressor 201 is turned on; and closes valves 206 and 207, opens valve 208, when compressor 201 is turned off. The proper sequencing and timing is subject to design constraints unique to a given application.

Another advantage of the preferred embodiment is the minimal use of mechanical moving parts, hence high reliability. The three additional valves (206–208) will not reduce the overall reliability of the system by a significant amount. Generally, leaks and faulty compressors are the primary source of system failures. An increased failure rate for the compressor could be caused by allowing the high pressure liquid in the refrigerant reservoir to back flow into the compressor during start-up of the compressor. This can be reduced by proper sequencing of the new valves as discussed above.

Figure 3:
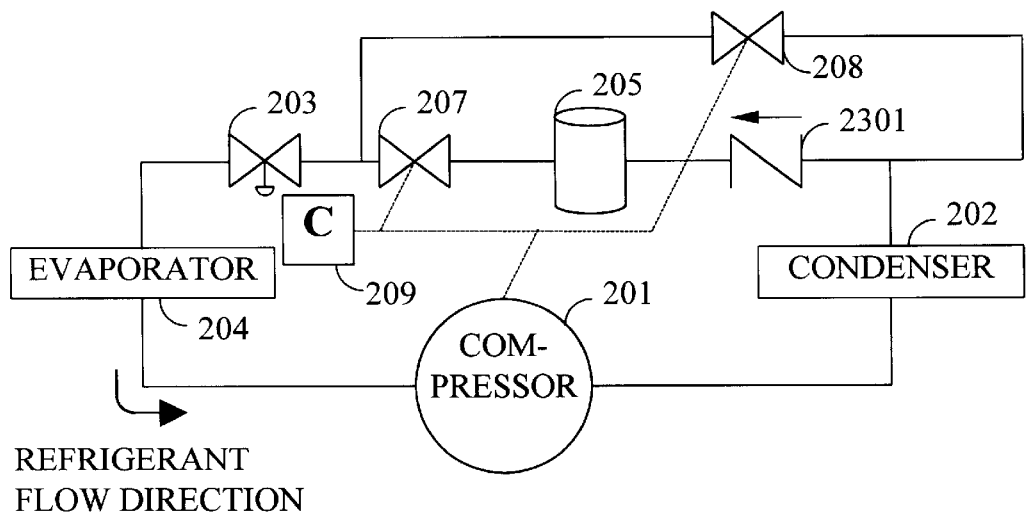
FIG. 3 is a schematic diagram showing an alternative embodiment of the air conditioning system shown in FIG. 2.
Figure 4:
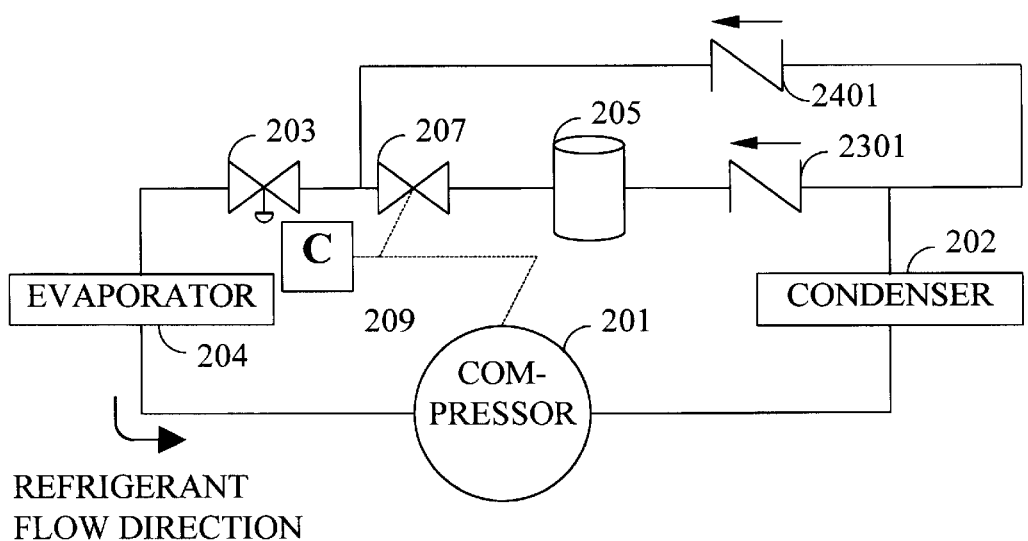
FIG. 4 is a schematic diagram showing an alternative embodiment of the air conditioning system shown in FIG. 2.
Figure 5:
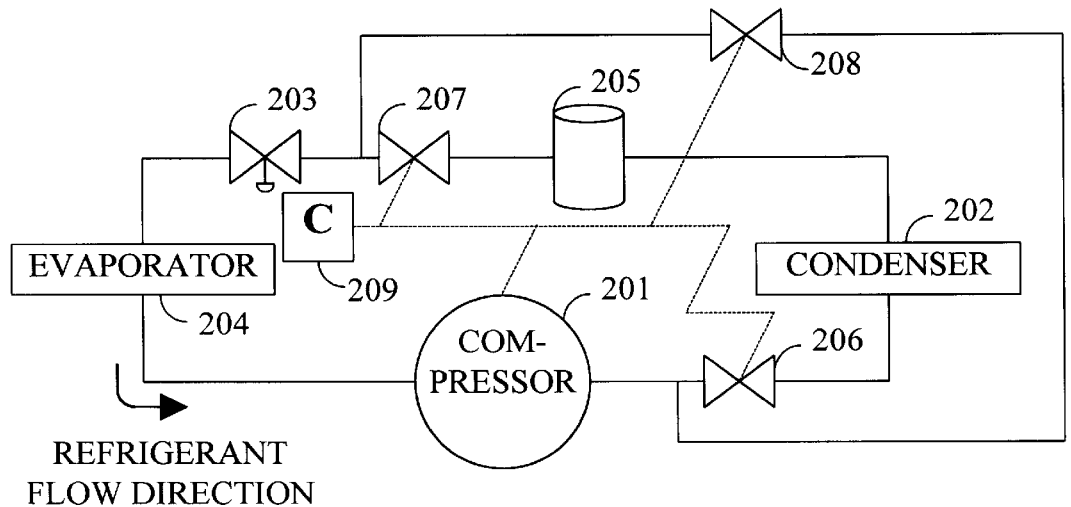
FIG. 5 is a schematic diagram showing an alternative embodiment of the air conditioning system shown in FIG. 2.
Figure 6:
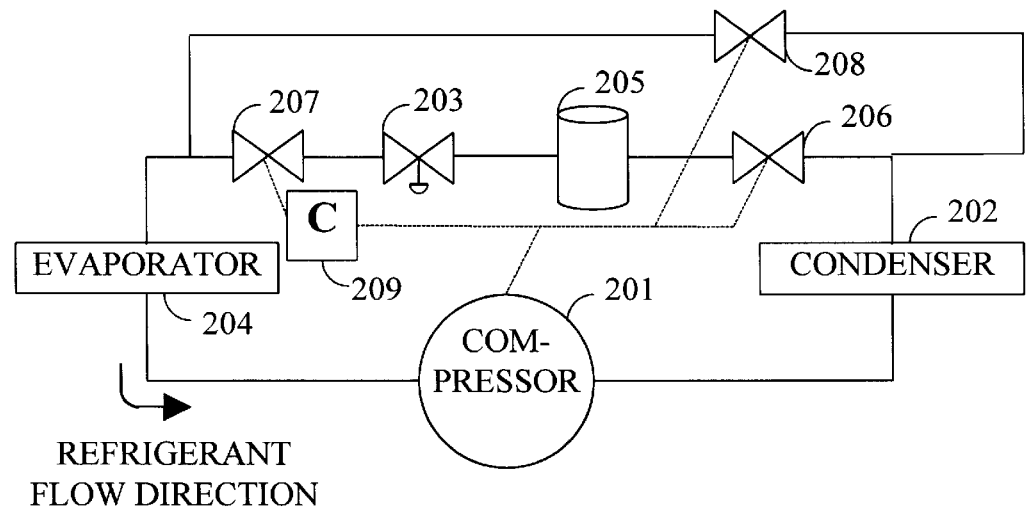
FIG. 6 is a schematic diagram showing an alternative embodiment of the air conditioning system shown in FIG. 2.

Several modifications are possible to the preferred embodiment. These include:

1. Bypass valve 208, which is optional, could be a check valve, in some arrangements such as the arrangement of FIG. 2. (See FIG. 4.)
2. Bypass valve 208, which is optional, may be a small diameter tube like a capillary tube.
3. Valve 206 may be moved to a location between compressor 201 and condenser 202. Valve 208 has to be moved accordingly to provide the bypass mechanism and allow the system to return to a non-operating equilibrium state during shutoff. For example, valve 208 may be connected between the high pressure side of compressor 201 and the inlet side of expansion valve 203. A system configuration employing this modification is shown in FIG. 5.
4. Valve 207 may be moved to between evaporator 204 and expansion valve 203. Valve 208 then has to be moved accordingly to provide the bypass mechanism. For example, valve 208 may be connected between the outlet of condenser 202 and the inlet of evaporator 204. This modification is shown in FIG. 6.
5. Other control mechanisms for the valves are possible. For example, controller 209 could open valves 206 and 207 and close valve 208 when the compressor 201 is turned on; then close valves 206 and 207 and open valve 208 when pressure at the refrigerant reservoir reaches a certain pressure. To reduce start-up demand on the compressor, during the start-up period of the compressor, valve 206 could remain closed while valve 208 is closed and 207 is opened.
6. Although it is not desirable for efficiency concerns, valve 206 may be a check valve as shown in FIG. 3 and 4.
7. The various valves of the system may be sequenced by controller 209 at start-up in order that the compressor 201 comes up to speed before the stored high pressure refrigerant is presented to the high pressure side of the compressor. Thus, either the valve (e.g. 206) that isolates the compressor from the condenser could be delayed in opening, or the bypass valve (e.g. 208) could be delayed in closing to achieve this desired result.
8. To prolong the life of compressor 201, controller 209 may provide compressor with a "soft" start or speed ramp up. To provide a "soft" start, controller 209 gradually applies more power to compressor 201 until compressor 201 is operating at full power. Such "soft" starts, as known to those skilled in the industry, reduce the initial startup stress experienced by compressor 201, thereby increasing its life span.
9. Some systems may require the closure of valves 206 and 207 after turning off compressor 201.
10. Any adapted combination of modification above.

The same principle can also be used for other refrigeration systems to reduce the time required to achieve refrigeration temperature. The principle can also be adapted to non-conventional air conditioning/refrigeration system, so long as their cooling rate can be improved by the release of stored working medium during a start-up period.

The five embodiments of FIG. 2–6 have been explained in detail as examples of how the present invention can be implemented. However, many variations of the components making up an air conditioning system are possible, all of which may employ the concepts of this invention. These variations result from the different placement of components of the basic air conditioning system and the components required to implement the improvement according to the present invention. For example, either high pressure vapor phase, high pressure liquid phase, or high pressure mixed liquid and vapor refrigerant can be isolated and maintained when the compressor is turned off. The expansion valve may or may not be included in the portion of the refrigerant path that is isolated. Similarly, the condenser may or may not be included in the portion of the refrigerant path that is isolated. The condenser may function as both the condenser and the refrigerant reservoir and the refrigerant reservoir could be eliminated. In a less preferred embodiment, one of the valve means, valve 206. could be eliminated altogether, in which case the compressor 201 (when off) acts as the upstream valve for isolating the high pressure refrigerant. Additionally, combinations of some of these variations are possible, and if a bypass valve 208 is used, it also has various possible connections in the system (as indicated by the dotted lines in the figures) and yet functions in the manner required as a bypass valve when the compressor 201 is turned off.

Since it is rudimentary to one of ordinary skill in the art of air conditioning to readily understand the differences in operation of an air conditioning system in which the various components are variously placed, FIG. 7–25 are presented for viewing some possibilities for interconnecting the components of an air conditioning system employing the present invention. Each drawing is briefly described below. It is to be understood, however, that the accompanying drawings are not exhaustive as to the number of possible different configurations of an air conditioning system employing the present invention, and the embodiments shown and described herein are to be considered as exemplary. Of course, for any combination of components which results in two valves in series (such as the control valve 207 and expansion valve 203 in FIG. 6) a single, dual-function valve can be substituted.

Figure 7:
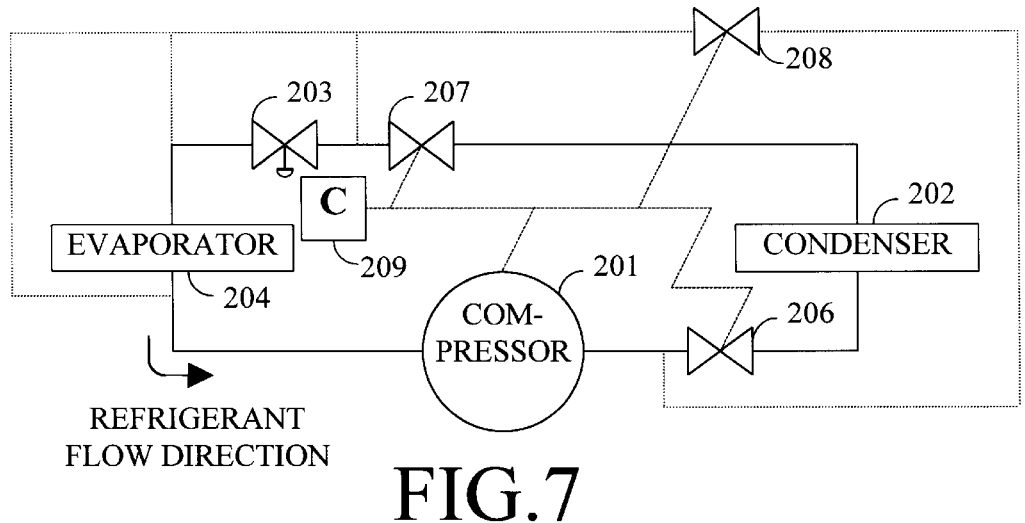
FIG. 7 is a schematic diagram showing an alternative embodiment of the air conditioning system shown in FIG. 2.
Figure 8:
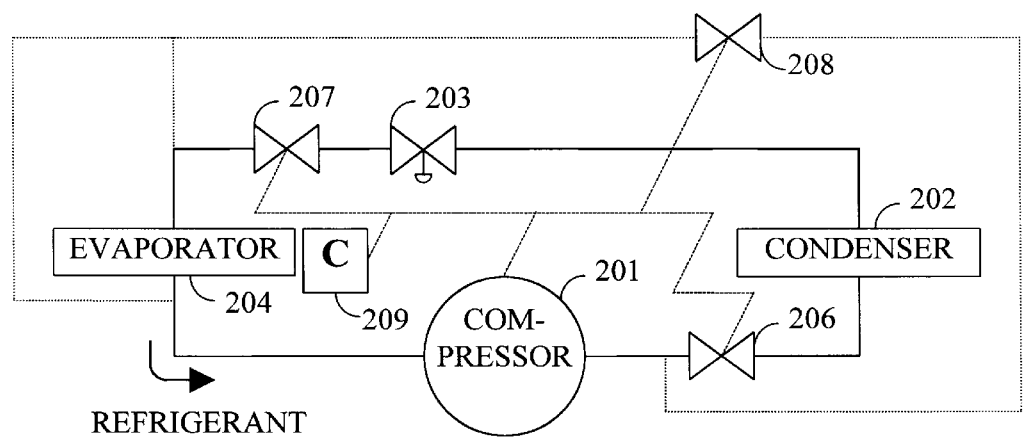
FIG. 8 is a schematic diagram showing an alternative embodiment of the air conditioning system shown in FIG. 2.

The arrangement of FIG. 7 shows that refrigerant reservoir 205 of FIG. 5 does not to be an separate mechanism. Instead, the tubing in condenser 202, along with the interconnecting tubing is isolated, thereby storing refrigerant when valves 207 and 206 are closed by controller 209. The broken lines emanating from valve 208 indicate the alternative connections places. For example, in FIG. 7 valve 208 connects to the output of compressor 201 on one side. The other side of valve 208 may be connected to the output of valve 207, the output of expansion valve 203, or the output of evaporator 204 provided that when controller 209 blocks off the storage section, refrigerant can flow through valve 208 from compressor's 201 high pressure side to its low pressure side. The embodiment of FIG. 8 is similar to that of FIG. 7. The primary difference here is that valve 207 has been placed after expansion valve 203. Additionally, optional bypass valve 208 must be re-routed to accommodate the new position of valve 207.

Figure 9:
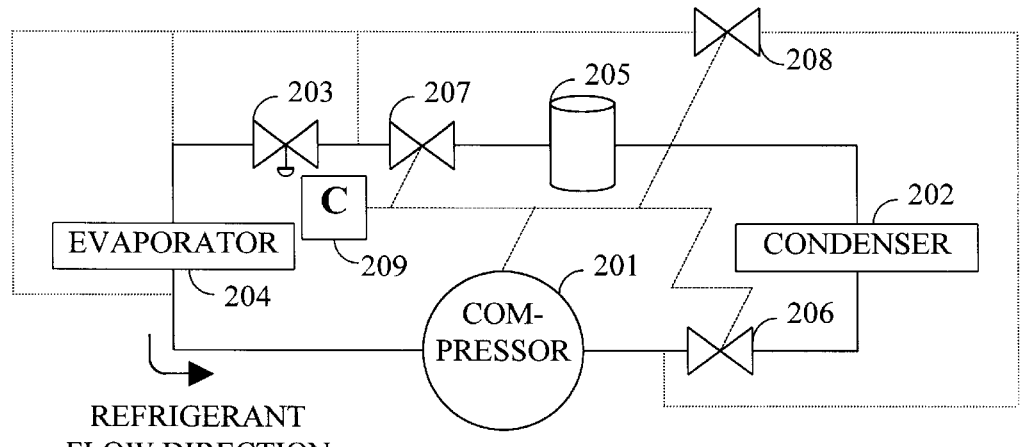
FIG. 9 is a schematic diagram showing an alternative embodiment of the air conditioning system shown in FIG. 2.
Figure 10:
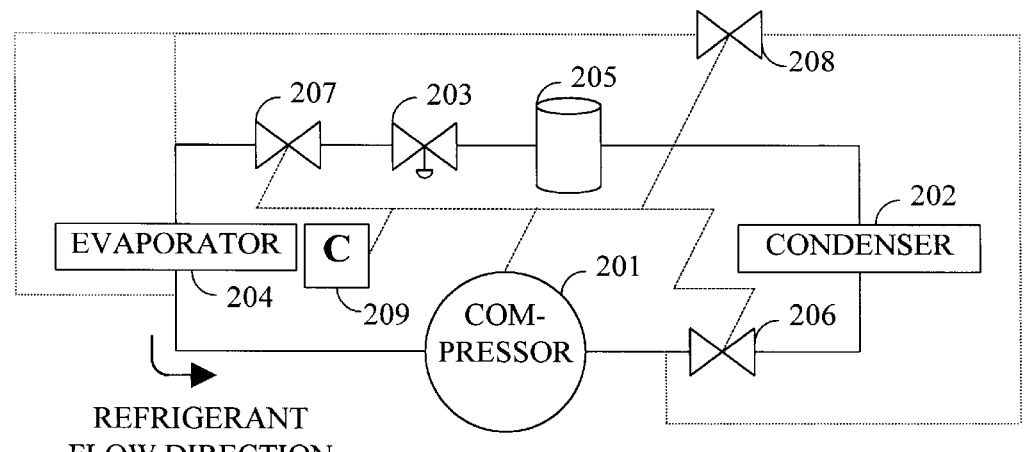
FIG. 10 is a schematic diagram showing an alternative embodiment of the air conditioning system shown in FIG. 2.
Figure 11:
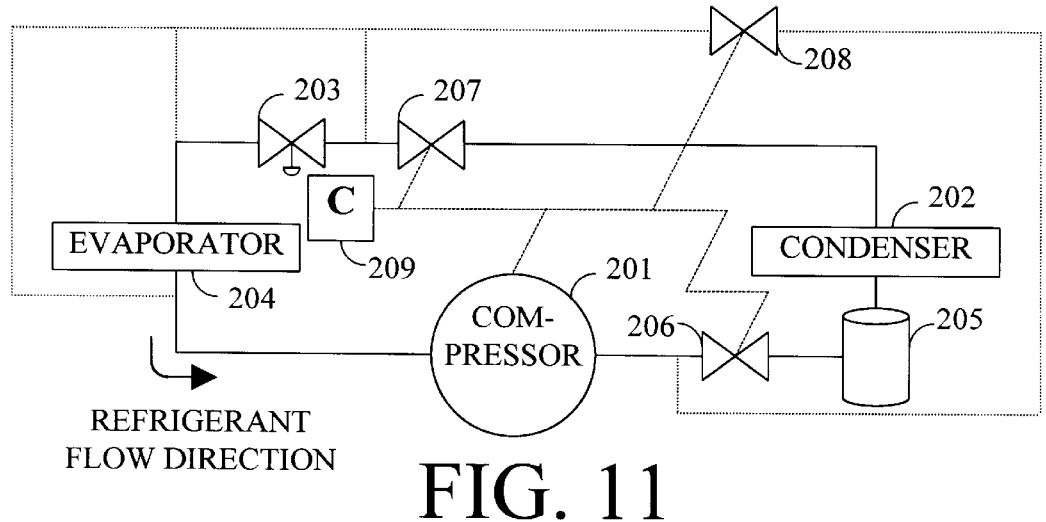
FIG. 11 is a schematic diagram showing an alternative embodiment of the air conditioning system shown in FIG. 2.
Figure 12:
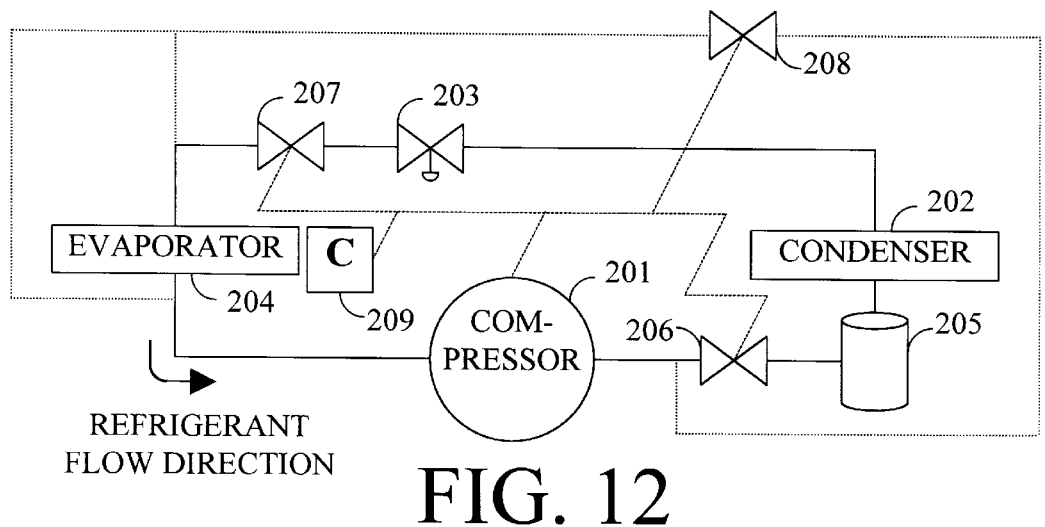
FIG. 12 is a schematic diagram showing an alternative embodiment of the air conditioning system shown in FIG. 2.

FIGS. 9 and 10 show refrigerant reservoir 205 added to the arrangements of FIGS. 7 and 8 respectively. In FIGS. 11 and 12 refrigerant reservoir 205 is placed between valve 206 and condenser 202.

Figure 13:
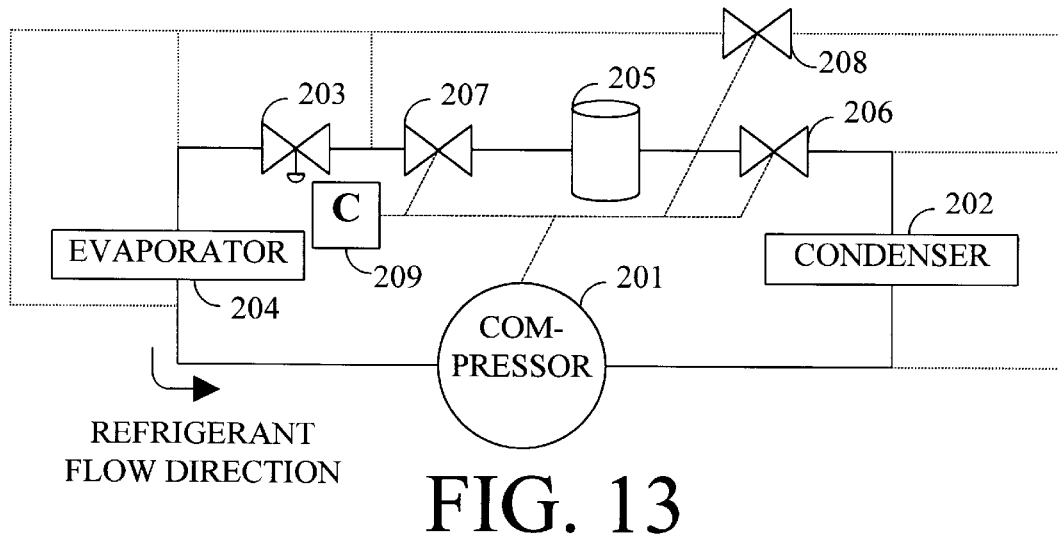
FIG. 13 is a schematic diagram showing an alternative embodiment of the air conditioning system shown in FIG. 2.
Figure 14:
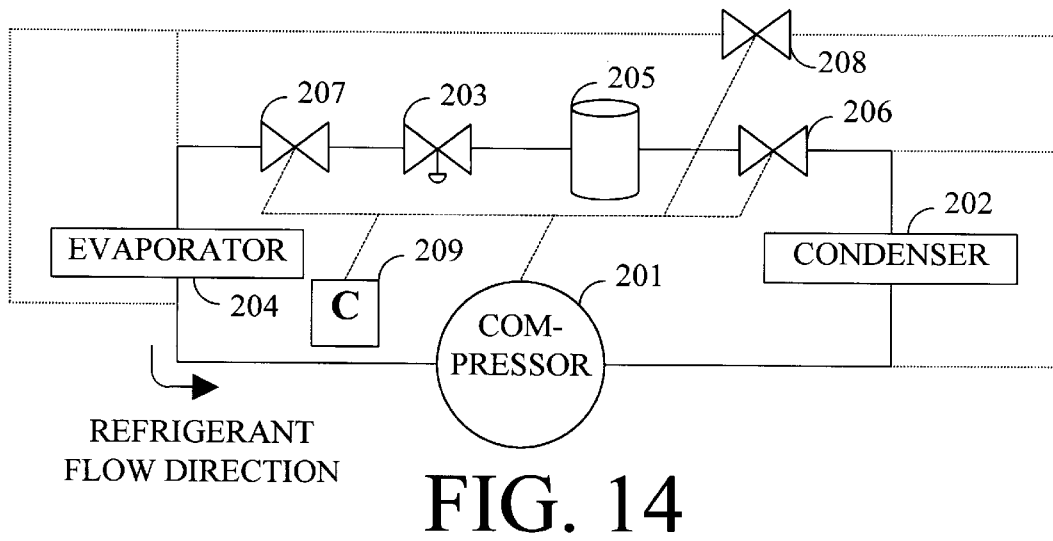
FIG. 14 is a schematic diagram showing an alternative embodiment of the air conditioning system shown in FIG. 2.
Figure 15:
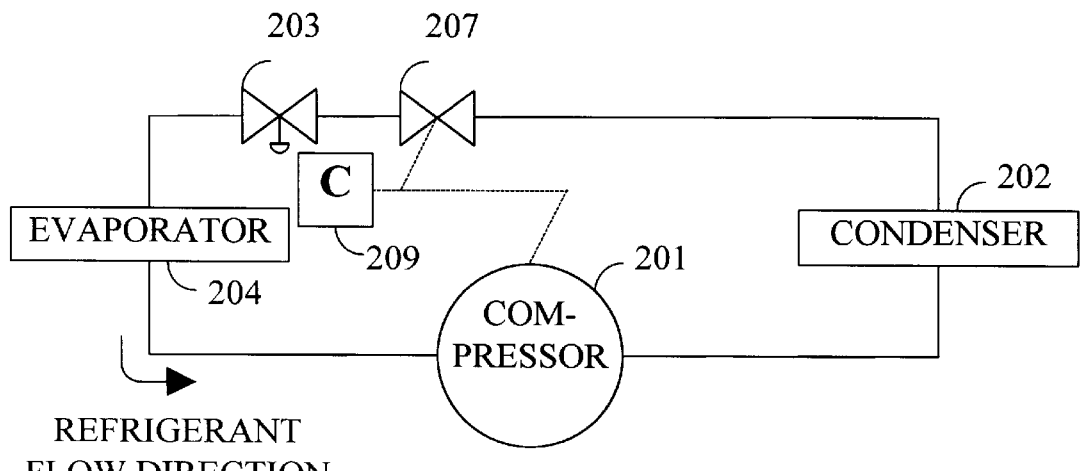
FIG. 15 is a schematic diagram showing an alternative embodiment of the air conditioning system shown in FIG. 2.
Figure 16:
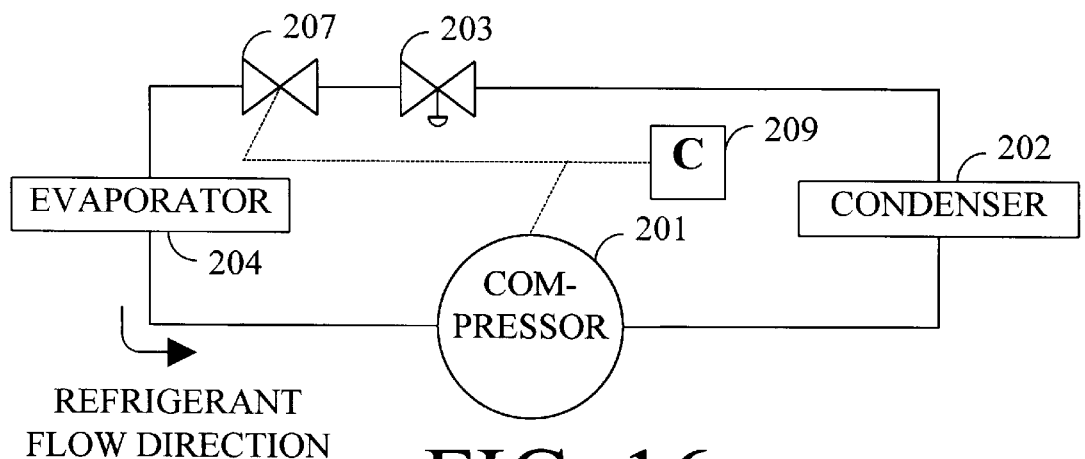
FIG. 16 is a schematic diagram showing an alternative embodiment of the air conditioning system shown in FIG. 2.
Figure 17:
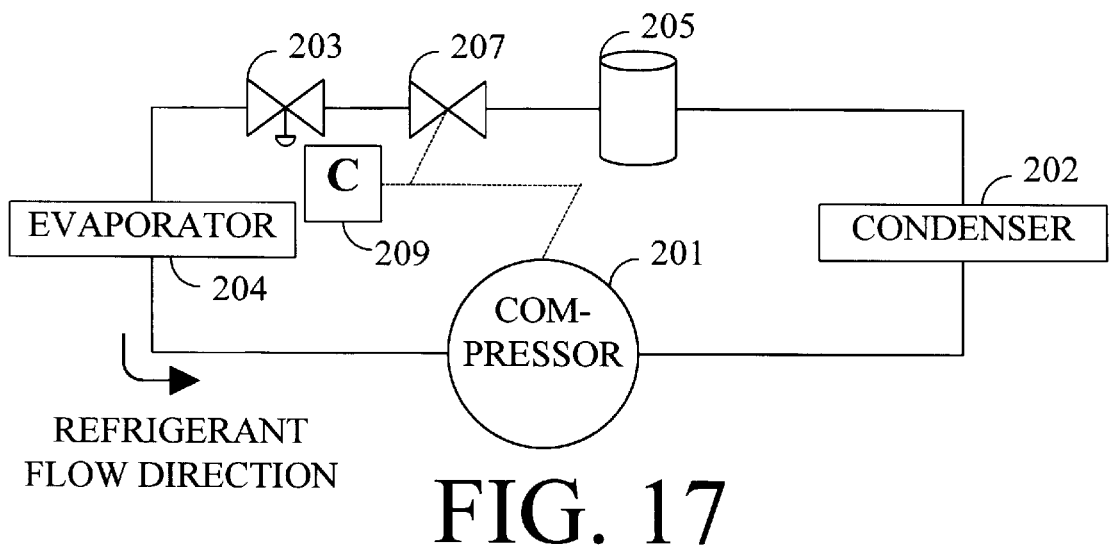
FIG. 17 is a schematic diagram showing an alternative embodiment of the air conditioning system shown in FIG. 2.
Figure 18:
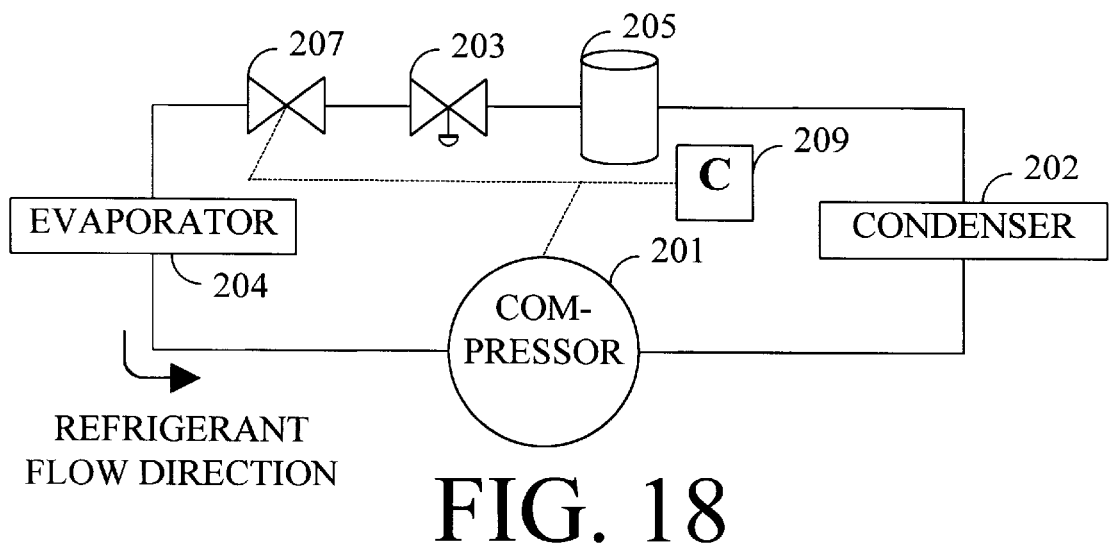
FIG. 18 is a schematic diagram showing an alternative embodiment of the air conditioning system shown in FIG. 2.
Figure 19:
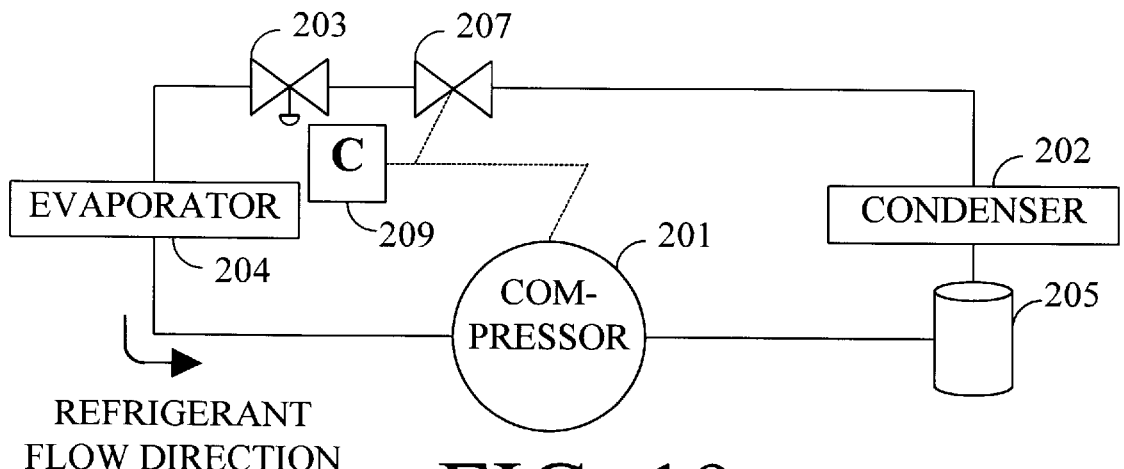
FIG. 19 is a schematic diagram showing an alternative embodiment of the air conditioning system shown in FIG. 2.
Figure 20:
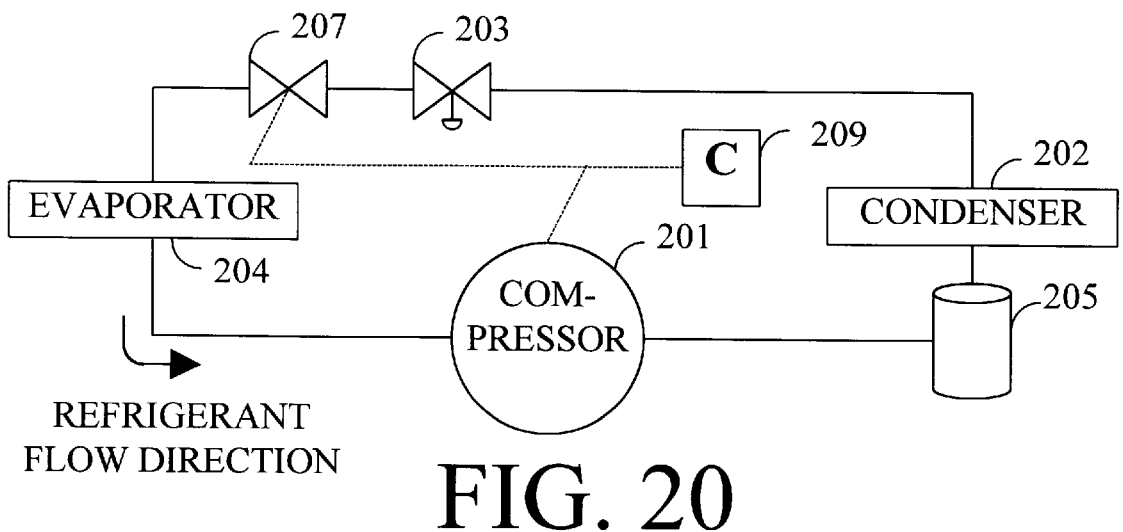
FIG. 20 is a schematic diagram showing an alternative embodiment of the air conditioning system shown in FIG. 2.

Expanding the number of locations in which bypass valve 208 may be connected in FIG. 2 yields the possibilities as shown in FIG. 13. Placing valve 207 after expansion valve 203 and adjusting the possible connections for the optional bypass valve 208 transforms FIG. 13 into FIG. 14.

FIGS. 15 through 20 all assume that when compressor 201 is off, no refrigerant may flow. With this assumption in mind, the embodiments shown in FIGS. 15 through 20 repeat the arrangements already described above.

Figure 21:
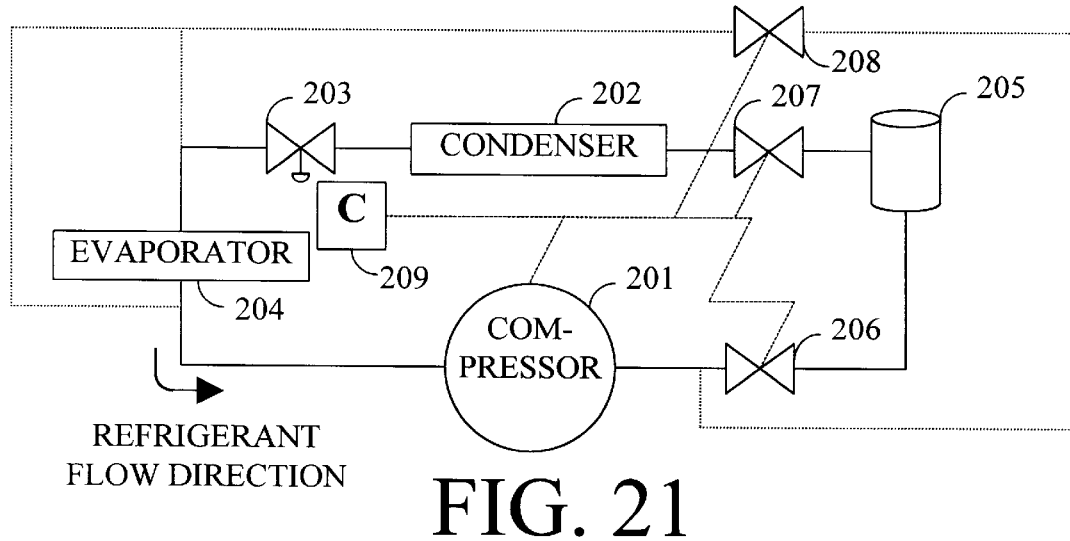
FIG. 21 is a schematic diagram showing an alternative embodiment of the air conditioning system shown in FIG. 2.

If refrigerant reservoir 205 is placed between compressor 201 and condenser 202, valve 206 must be placed between compressor 201 and refrigerant reservoir as shown in FIGS. 11 and 12. However, in FIGS. 11 and 12, valve 207 was placed after condenser 202. In FIG. 21, valve 207 is placed between condenser 202 and refrigerant reservoir 205.

Figure 22:
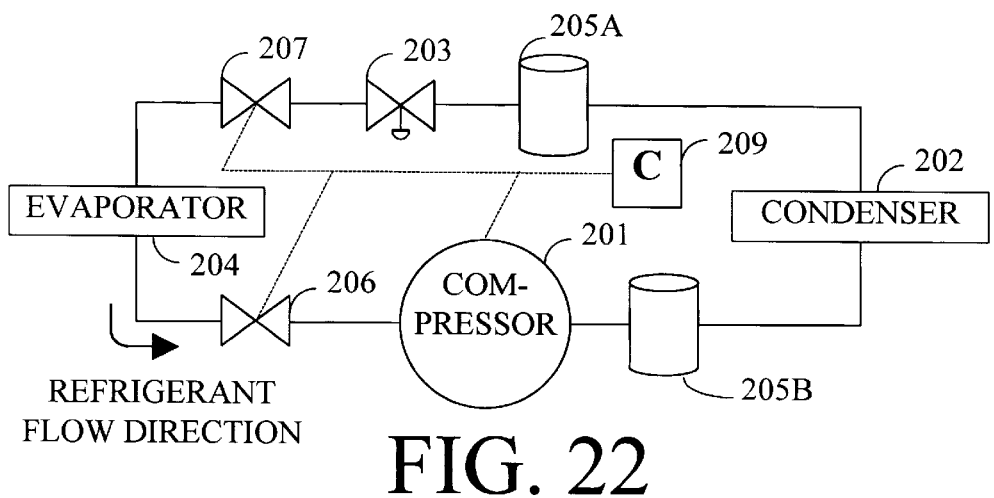
FIG. 22 is a schematic diagram showing an alternative embodiment of the air conditioning system shown in FIG. 2.

Turning next to FIG. 22, valve 206 has been moved to between evaporator 204 and compressor 201. Additionally, in this embodiment, a second refrigerant reservoir has been added. Thus, when controller 209 turns compressor 201 off and closes valves 207 and 206, refrigerant is stored in compressor 201, refrigerant reservoir 205B, condenser 202, refrigerant reservoir 205A, and expansion valve 203.

Figure 23:
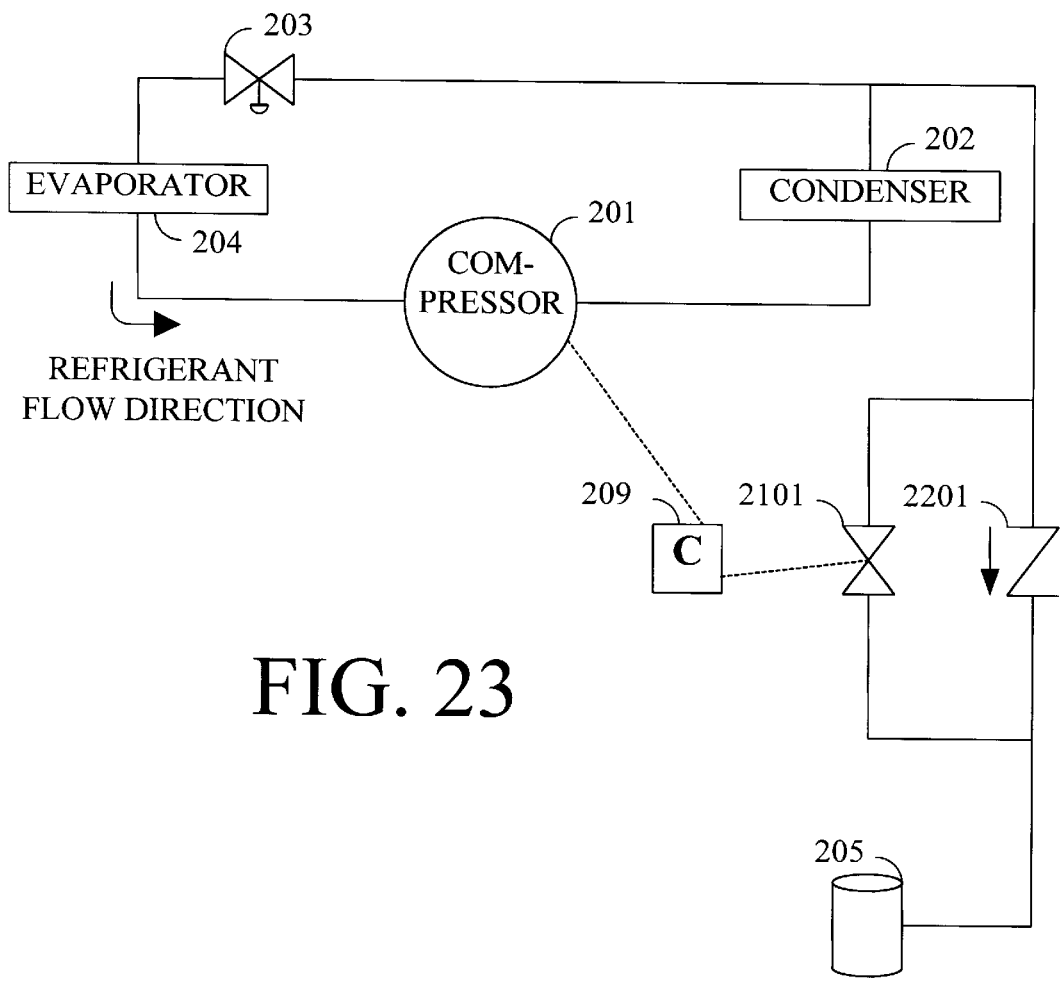
FIG. 23 is a schematic diagram showing an alternative embodiment of the air conditioning system shown in FIG. 2.

Referring next to FIG. 23. In the previous embodiments, refrigerant reservoir 205 is placed in the refrigerant loop, however, as shown in these figures, this is not necessary. Keeping in mind that the primary purpose of the refrigerant reservoir is to store refrigerant it is possible to "T" (or branch) couple into the refrigerant path. In the embodiment in FIG. 23, refrigerant reservoir is coupled to the refrigerant path by way of a "T" type connection. It should be noted that while the embodiment of FIG. 23 shows the "T" coupling occurring between condenser 202 and expansion valve 203, other coupling places are equally possible. One skilled in the art, after having read the descriptions of the previous embodiments, including the preferred embodiment, will understand where these couplings may occur.

During normal operation, as controlled by controller 209, compressor 201 is running and bi-directional valve 2101 is closed. As compressor 201 pressurizes the system up to operating equilibrium, one-way (or check) valve 2201 allows pressurized refrigerant to enter refrigerant reservoir 205. One-way valve 2201 prevents pressurized refrigerant from exiting refrigerant reservoir 205. Thus, with this arrangement, the peak pressure of the pressurized refrigerant is stored in refrigerant reservoir 205.

During shut-down, controller 209 simply turns off compressor 201. Startup of the system requires controller 209 to synchronize certain activities. Numerous possible synchronizing methods are possible, however, to aid the reader in understanding the basic operation an exemplary method will be explained.

First, controller 209 turns on compressor 201. However, as already explained this action alone does not provide heat pumping action until the system reaches operating equilibrium. To more quickly reach operating equilibrium, controller must also open valve 2101, thereby releasing the stored refrigerant in refrigerant reservoir 205. Controller 209 may open valve 2101 simultaneously with turning on compressor 201 or, more preferably, introduce a small delay. This delay allows compressor 201 start-up without additional back pressure from the pressurized refrigerant from refrigerant reservoir 205. After a predetermined delay, the system reaches operating equilibrium at which time controller 209 closes valve 2101.

One skilled in the art will understand that the embodiment just described may be modified to exclude one-way valve 2201. Such modification requires controller 209 to keep valve 2101 open while compressor 201 is operating and close it when the compressor is turned off. Such and arrangement may not store the "peak pressure" in refrigerant reservoir 205.

Figure 24:
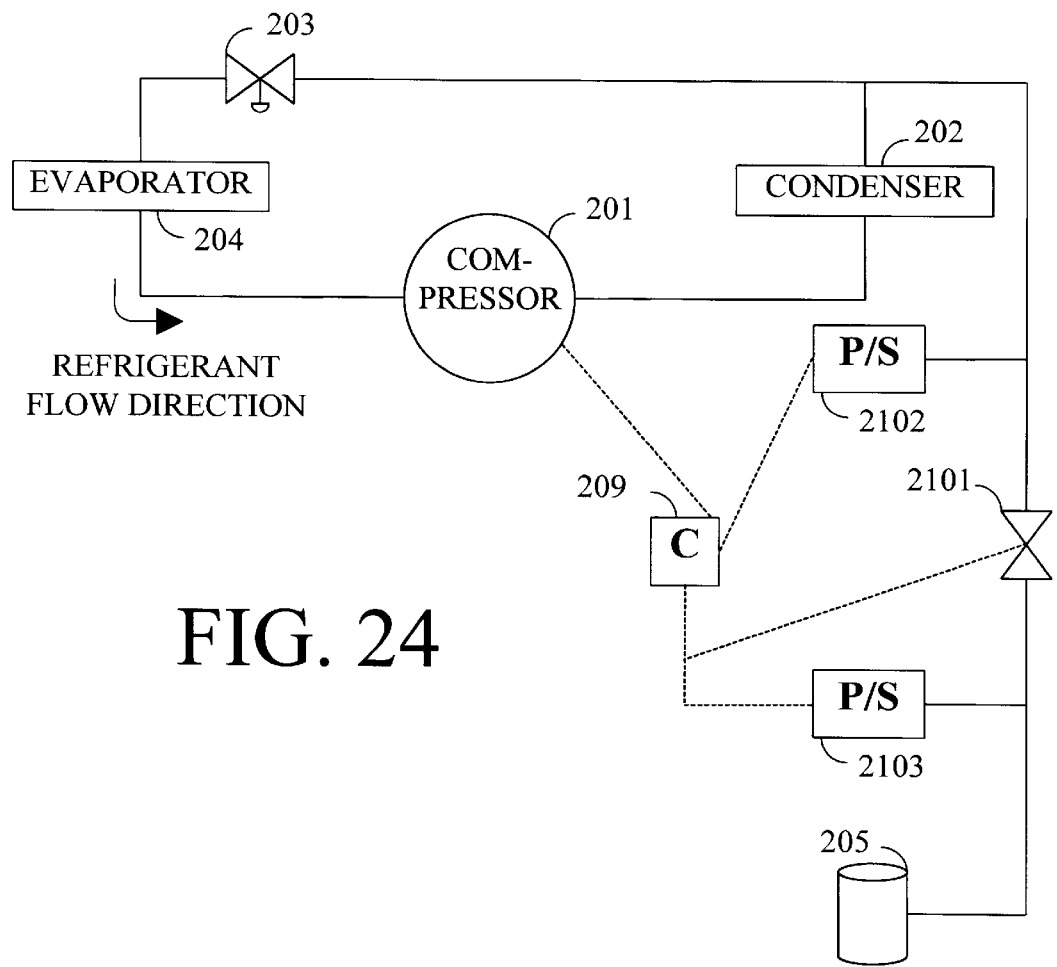
FIG. 24 is a schematic diagram showing an alternative embodiment of the air conditioning system shown in FIG. 2.

If, one-way valve 2201 is removed, but the "peak pressure" operation described for FIG. 23 is to be retained, controller 209 needs additional information to intelligently operate valve 2101 to capture the peak pressure refrigerant. FIG. 24 shows an embodiment whereby the "peak pressure" operation is retained with single valve. Because the start-up and shut-down modes of operation should be apparent to one skilled in the art after having read the previous discussion, only the "peak pressure" capture mode will be explain. Once the system reaches operating equilibrium, controller 209 monitors pressure sensors 2102 and 2103. Whenever controller 209 detects that pressure sensor 2102 is indicating a pressure that is higher that the pressure indicated by pressure sensor 2103, controller 209 opens valve 2101. With valve 2101 open, controller 209 monitors the pressure sensors and closes valve 2101 when a drop in pressure is detected. In this way, the peak pressure refrigerant in the system is captured and stored in refrigerant reservoir 205.

Figure 25:
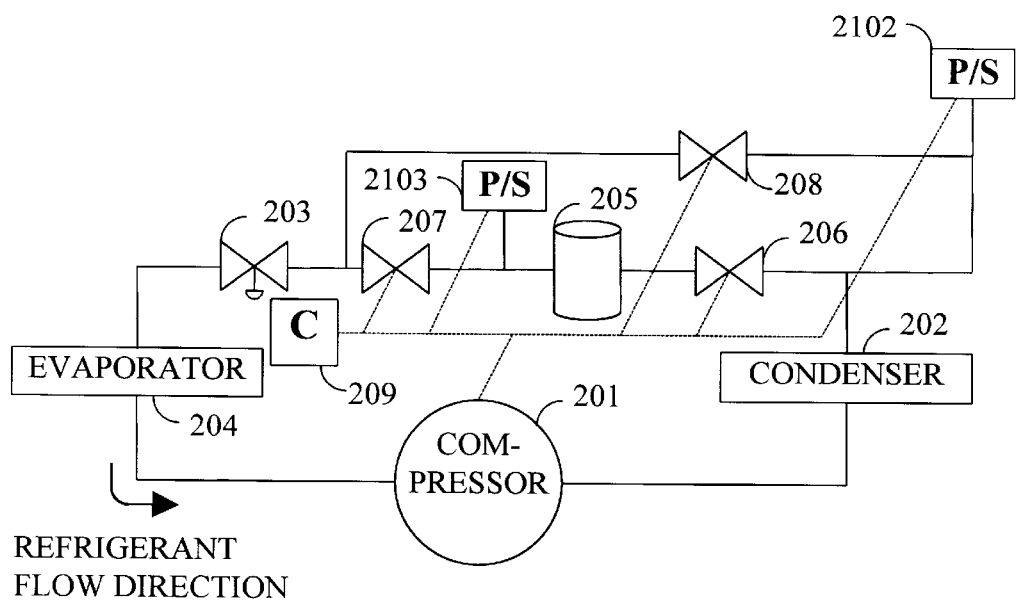
FIG. 25 is a schematic diagram showing an alternative embodiment of the air conditioning system shown in FIG. 2.

Referring briefly to FIG. 2, this arrangement may operate to store the "peak pressure" as describe above. Two basic modes of operation produce the desired peak capture mode. First, if valve 207 is closed and valve 208 is opened about the time the system reaches operating equilibrium, then refrigerant reservoir 205 is effectively "T" coupled into the refrigerant path at valve 206. During operating equilibrium, valve 206 is manipulated as valve 2101 in FIG. 24 to capture the peak pressure refrigerant. A second mode effectively opens both valve 206 and 207 to capture the peak pressure refrigerant and then closes both to store it. For both methods, the stored high pressure refrigerant in refrigerant reservoir 205 is released through valve 207 during startup of compressor 201. Independent of which mode is used, to operate the arrangement of FIG. 2 in the peak pressure mode, additional pressure sensors are needed. FIG. 25 provides an example of how these modifications and additions of pressure sensors may be made.

In short, the present invention stores the vapor or liquid refrigerant produced by the system during operation in a refrigerant reservoir or in the fluid conduits of the system, thereby keeping the stored refrigerant under pressure (in a vapor or liquid phase) when the compressor is turned off. To achieve quick cooling, the stored refrigerant is released at start-up to the evaporator through the expansion valve when the compressor is turned on. The present invention helps save energy because cooling stops once the compressor is turned off. Air conditioning not using the present invention keep on cooling after the compressor is turned off because of residual high pressure refrigerant in the system. However, a system using the present invention captures the "residual" high pressure refrigerant and saves it for the next start-up, where it is needed.

Although the preferred embodiment of the invention has been illustrated, and that form described, it is readily apparent to those skilled in the art that various modifications may be made therein without departing from the spirit of the invention or from the scope of the appended claims.

What is claimed is:

1. A refrigeration system for providing a cooling effect upon start-up, said refrigeration system having a closed loop fluid flow path for a refrigerant, said system comprising:

a compressor in said path having a low pressure side and a high pressure side;

a condenser having an input and an output, said condenser input coupled to said high pressure side of said compressor;

a reservoir;

a first valve having a first side coupled to said condenser output and a second side coupled to said reservoir;

a second valve having a first side coupled to said reservoir and a second side;

an expansion valve having an input and an output, said expansion valve input coupled to said second side of said second valve;

an evaporator coupled between said output of said expansion valve and said low pressure side of said compressor;

a bypass connected to said first side of said first valve and to said second side of said second valve; and a controller means for controlling said compressor, said first valve and said second valve, said controller means controls said first valve and said second valve to trap said refrigerant in said reservoir at its present pressure when said compressor is turned off, said controller means controls said first valve and said second valve to release said refrigerant when said compressor is turned on.

2. The refrigeration system as claimed in claim 1 wherein said reservoir comprising a tank.

3. The refrigeration system as claimed in claim 1 wherein said reservoir comprising that portion of said closed loop between said first valve and said second valve.

4. The refrigeration system as claimed in claim 1 wherein said reservoir is in said loop coupled between said high pressure side of said compressor and said input of said expansion valve.

5. A refrigeration system for providing a cooling effect upon start-up, said refrigeration system having a closed loop fluid flow path for a refrigerant, said system comprising:

a compressor in said path having a low pressure side and a high pressure side;

a condenser having an input and an output, said condenser input coupled to said high pressure side of said compressor;

an expansion valve having an input and an output, said expansion valve input coupled to said condenser output;

an evaporator coupled between said output of said expansion valve and said low pressure side of said compressor;

an isolation valve means in said path for trapping said refrigerant at its present pressure in a portion of said path;

a bypass means for bypassing said isolation valve means and allowing said refrigerant to pass through said evaporator when said compressor is off; and a controller means for controlling said compressor and said isolation valve means, said controller means signals said isolation valve means to trap said refrigerant in said portion of said path when said compressor is off, in the alternative, said controller means signals said isolation valve means to release said trapped refrigerant in said portion of said path when said compressor is turned on.

6. The refrigeration system as claimed in claim 5, wherein said path portion is between said condenser and said expansion valve.

7. The refrigeration system as claimed in claim 5, wherein said path portion is between said compressor and said expansion valve, said condenser is located in said path portion.

8. The refrigeration system as claimed in claim 5, wherein said path portion is between said condenser and said evaporator, said expansion valve is located in said path portion.

9. The refrigeration system as claimed in claim 5, wherein said path portion is between said compressor and said condenser.

10. The refrigeration system as claimed in claim 5, wherein said path portion is between said compressor and said evaporator, said condenser and said expansion valve are located in said path portion.

11. The refrigeration system as claimed in claim 5, wherein said path portion includes at least one reservoir.

12. The refrigeration system as claimed in claim 6, wherein said path portion includes at least one reservoir.

13. The refrigeration system as claimed in claim 5, comprising means for sequencing operation of said compressor and said isolation valve means, wherein said isolation valve means is operated to release said trapped refrigerant after start-up of said compressor.

14. The refrigeration system as claimed in claim 5, wherein said path portion includes at least one reservoir means for storage of said refrigerant when said compressor is off.

15. The refrigeration system as claimed in claim 5, comprising means for sequencing operation of said compressor and said isolation valve means, wherein said compressor is turned on after said isolation valve means is operated to release said trapped refrigerant and before said trapped refrigerant returns to a non-operating equilibrium pressure.

16. The refrigeration system as claimed in claim 5, comprising means for sequencing operation of said compressor and said isolation valve means, wherein said isolation valve means is operated to trap said refrigerant after said compressor is turned off and before said refrigerant returns to a non-operating equilibrium pressure.

17. The refrigeration system as claimed in claim 5, comprising means for sequencing operation of said compressor and said isolation valve means, wherein said isolation valve means is operated to trap said refrigerant when said compressor is turned off.

18. A refrigeration system for providing a cooling effect upon start-up, said refrigeration system having a closed loop fluid flow path for a refrigerant, said system comprising:

a compressor in said closed loop having a low pressure side and a high pressure side;

a condenser having an input and an output, said condenser input coupled to said high pressure side of said compressor;

an expansion valve having an input and an output, said expansion valve input coupled to said condenser output;

an evaporator coupled between said output of said expansion valve and said low pressure side of said compressor;

a reservoir means for trapping said refrigerant, said reservoir means further for releasing said trapped refrigerant;

a bypass means for bypassing said reservoir means and allowing said refrigerant to pass through said evaporator when said compressor is off; and a controller means for controlling said compressor and said reservoir means, said controller means controls said reservoir means to trap said refrigerant at its present pressure when said compressor is off, said controller means controls said reservoir means to release said trapped refrigerant when said compressor is turned on.

19. The refrigeration system as claimed in claim 18 wherein said reservoir means is in said loop coupled between said condenser and said expansion valve.

20. The refrigeration system as claimed in claim 19 wherein said reservoir means comprising:

a storing means for storing said refrigerant;

a first valve having a first side coupled to said condenser and a second side coupled to said storing means; and a second valve having a first side coupled to said storing means and a second side coupled to said input of said expansion valve.

21. The refrigeration system as claimed in claim 20 wherein said storing means comprising a tank.

22. The refrigeration system as claimed in claim 20 wherein said storing means comprising that portion of said closed loop between said first valve and said second valve.

23. The refrigeration system as claimed in claim 18 wherein said reservoir means branches from said closed loop between said condenser and said expansion valve.

24. The refrigeration system as claimed in claim 23 further comprising:

a one-way valve coupled between said branch and a tank, said one-way valve allowing said refrigerant to flow only from said branch to said tank; and a bi-directional valve connected in parallel with said one-way valve, said bi-directional valve having an open position and a closed position, said controller means controls whether said bi-directional valve is in said open position or said closed position.

25. The refrigeration system as claimed in claim 23 further comprising:

a bi-directional valve coupled between said branch and a tank, said bi-directional valve having an open position and a closed position, said controller means controls whether said bi-directional valve is in said open position or said closed position;

a first pressure sensor connected to said controller means and sensing a first pressure of said refrigerant at said branch;

a second pressure sensor connected to said controller means and sensing a second pressure of said refrigerant at said tank; and said controller means forces said bi-directional valve into said open position when said first pressure is greater than said second pressure, said controller means forces said bi-directional valve into said closed position when said first pressure is decreasing, said controller means forces said bi-directional valve into said open position when said compressor is turned on.

26. The refrigeration system as claimed in claim 19 further comprising a first valve coupled between said condenser and said compressor; said reservoir means comprising:

a storing means for storing said refrigerant; and a second valve having a first side coupled to said storing means and a second side coupled to said input of said expansion valve.

* * * * *